under 35 U.S.C. 154(b) by 54 days.

(12) United States Patent
Allen et al.

(10) Patent No.: US 11,016,749 B1
(45) Date of Patent: *May 25, 2021

(54) ARCHITECTURE FOR INCREMENTAL DEPLOYMENT

(71) Applicant: Amazon Technologies, Inc., Seattle, WA (US)

(72) Inventors: Nicholas A. Allen, Redmond, WA (US); Elena Dykhno, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/280,726

(22) Filed: Feb. 20, 2019

Related U.S. Application Data

(63) Continuation of application No. 15/374,706, filed on Dec. 9, 2016, now Pat. No. 10,275,232, which is a continuation of application No. 14/708,019, filed on May 8, 2015, now Pat. No. 9,560,120, which is a continuation of application No. 14/274,240, filed on May 9, 2014, now Pat. No. 9,032,393, which is a continuation of application No. 13/287,860, filed on Nov. 2, 2011, now Pat. No. 8,726,264.

(51) Int. Cl.
*G06F 9/44* (2018.01)
*G06F 8/65* (2018.01)
*H04L 29/08* (2006.01)

(52) U.S. Cl.
CPC .............. *G06F 8/65* (2013.01); *H04L 67/10* (2013.01); *H04L 67/34* (2013.01)

(58) Field of Classification Search
CPC ............ G06F 8/65; H04L 67/10; H04L 67/34

USPC ........................................................ 717/173
See application file for complete search history.

(56) References Cited

U.S. PATENT DOCUMENTS

| | | |
|---|---|---|
| 2,942,668 A | 6/1960 | Maly et al. |
| 5,278,194 A | 1/1994 | Tickner et al. |
| 5,652,883 A | 7/1997 | Adcock |
| 5,950,209 A | 9/1999 | Carrier, III et al. |
| 6,349,407 B1 | 2/2002 | Towfiq |
| 6,363,396 B1 | 3/2002 | Klots et al. |
| 6,553,411 B1 | 4/2003 | Dias et al. |

(Continued)

OTHER PUBLICATIONS

U.S. Appl. No. 13/287,843 , "Final Office Action", dated Dec. 5, 2013, 24 pages.

(Continued)

*Primary Examiner* — Anna C Deng
(74) *Attorney, Agent, or Firm* — Kilpatrick Townsend & Stockton LLP

(57) ABSTRACT

A deployment proxy service is provided to manage communications between a client device and a deployment service. The deployment proxy service receives upload requests from the client device and saves software artifacts associated with the upload request in a proxy repository. The deployment proxy service determines a continuation deployment action that describes information about a target machine to which the software artifacts are applicable. When appropriate, the deployment proxy service provides information to the deployment service that enables the deployment service to deploy the software artifacts to the target machine (e.g., to update an application of the target machine).

17 Claims, 11 Drawing Sheets

(56) References Cited

U.S. PATENT DOCUMENTS

| | | | |
|---|---|---|---|
| 7,159,036 | B2 | 1/2007 | Hinchliffe et al. |
| 7,237,239 | B1 | 6/2007 | Goel et al. |
| 7,293,099 | B1 | 11/2007 | Kalajan |
| 7,665,081 | B1 | 2/2010 | Pavlyushchik |
| 8,176,256 | B2 | 5/2012 | Krishnaprasad et al. |
| 8,375,290 | B1 | 2/2013 | Chan et al. |
| 8,554,790 | B2 | 10/2013 | Turk |
| 8,555,273 | B1* | 10/2013 | Chia .................. G06F 8/654 |
| | | | 717/173 |
| 8,595,331 | B2 | 11/2013 | Henseler et al. |
| 8,726,264 | B1 | 5/2014 | Allen et al. |
| 8,984,162 | B1 | 3/2015 | Allen et al. |
| 9,032,393 | B1 | 5/2015 | Allen et al. |
| 9,229,740 | B1 | 1/2016 | Allen et al. |
| 9,367,369 | B2* | 6/2016 | Chandler ............. G06F 9/546 |
| 9,560,120 | B1 | 1/2017 | Allen et al. |
| 2003/0031176 | A1 | 2/2003 | Sim |
| 2003/0046586 | A1 | 3/2003 | Bheemarasetti et al. |
| 2004/0001087 | A1 | 1/2004 | Warmus et al. |
| 2004/0020643 | A1 | 2/2004 | Thomeer et al. |
| 2004/0133444 | A1 | 7/2004 | Defaix et al. |
| 2005/0038890 | A1 | 2/2005 | Masuda et al. |
| 2005/0071839 | A1 | 3/2005 | Kim et al. |
| 2005/0109511 | A1 | 5/2005 | Spencer et al. |
| 2005/0165828 | A1 | 7/2005 | Lango et al. |
| 2006/0075408 | A1 | 4/2006 | Powers et al. |
| 2006/0287740 | A1 | 12/2006 | Ertel |
| 2006/0288080 | A1 | 12/2006 | Orszag et al. |
| 2008/0098099 | A1 | 4/2008 | Khasnis et al. |
| 2008/0109620 | A1 | 5/2008 | Nabekura |
| 2008/0109801 | A1* | 5/2008 | Levine .................. G06F 8/60 |
| | | | 717/171 |
| 2008/0154983 | A1 | 6/2008 | Lee et al. |
| 2009/0037601 | A1 | 2/2009 | Jain et al. |
| 2010/0077468 | A1 | 3/2010 | Pragides et al. |
| 2010/0251329 | A1 | 9/2010 | Wei |
| 2010/0293338 | A1 | 11/2010 | Krishnaprasad et al. |
| 2010/0299553 | A1 | 11/2010 | Cen |
| 2011/0096828 | A1 | 4/2011 | Chen et al. |
| 2011/0132621 | A1 | 6/2011 | Agrawal et al. |
| 2011/0219135 | A1 | 9/2011 | Minamizawa et al. |
| 2011/0225368 | A1 | 9/2011 | Burge, III |
| 2011/0289150 | A1 | 11/2011 | Westaway et al. |
| 2011/0321028 | A1 | 12/2011 | Evans et al. |
| 2012/0102220 | A1 | 4/2012 | Hopmann et al. |
| 2012/0304174 | A1 | 11/2012 | Arnold et al. |
| 2012/0324020 | A1 | 12/2012 | O'Sullivan et al. |
| 2013/0054927 | A1 | 2/2013 | Raj et al. |

OTHER PUBLICATIONS

U.S. Appl. No. 13/287,843 , "Non-Final Office Action", dated May 30, 2013, 22 pages.

U.S. Appl. No. 13/287,843 , "Non-Final Office Action", dated May 8, 2014, 32 pages.

U.S. Appl. No. 13/287,843 , "Notice of Allowance", dated Nov. 6, 2014, 11 pages.

U.S. Appl. No. 13/287,843 , "Optimizing Performance for Routing Operations", Nov. 2, 2011.

U.S. Appl. No. 13/287,860 , "Notice of Allowance", dated Jan. 2, 2014, 19 pages.

13/287,860 , "Architecture for Incremental Deployment", Nov. 2, 2011.

U.S. Appl. No. 13/287,867 , "Cache-Assisted Upload Proxy.", Nov. 2, 2011.

U.S. Appl. No. 13/287,867 , "Final Office Action", dated May 21, 2015, 25 pages.

U.S. Appl. No. 13/287,867 , "Final Office Action", dated Dec. 31, 2013, 26 pages.

U.S. Appl. No. 13/287,867 , "Non Final Office Action", dated Oct. 23, 2014, 30 pages.

U.S. Appl. No. 13/287,867 , "Non-Final Office Action", dated May 13, 2013, 22 pages.

U.S. Appl. No. 13/287,867 , "Notice of Allowance", dated Sep. 8, 2015, 7 pages.

U.S. Appl. No. 14/274,240 , "Architecture for Incremental Deployment", U.S. Patent Application, May 9, 2014.

U.S. Appl. No. 14/274,240 , "Notice of Allowance", dated Oct. 21, 2014, 17 pages.

U.S. Appl. No. 14/274,240 , "Notice of Allowance", dated Jan. 27, 2015, 8 pages.

U.S. Appl. No. 14/708,019 , "Notice of Allowance", dated Sep. 23, 2016, 17 pages.

U.S. Appl. No. 15/374,706 , "Final Office Action", dated Jun. 29, 2018, 16 pages.

U.S. Appl. No. 15/374,706 , "Non-Final Office Action", dated Mar. 1, 2018, 22 pages.

U.S. Appl. No. 15/374,706 , "Notice of Allowance", dated Dec. 20, 2018, 15 pages.

Collins-Sussman et al., "Version Control with Subversion for Subversion 1.5", 2008, pp. 234 & 239.

* cited by examiner

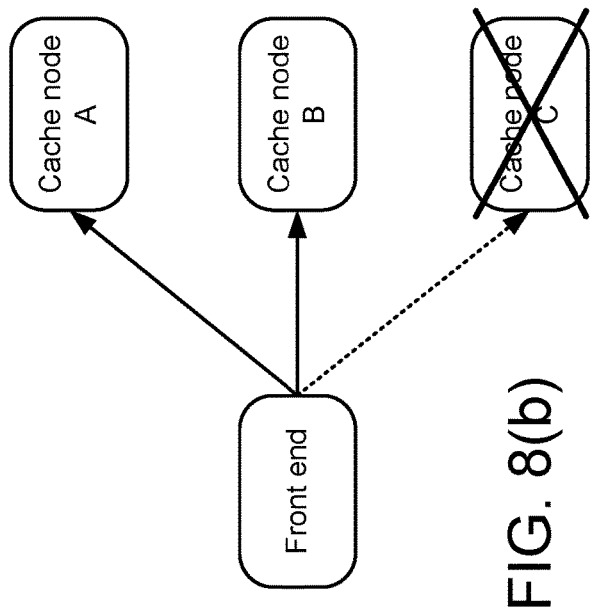
FIG. 8(b)
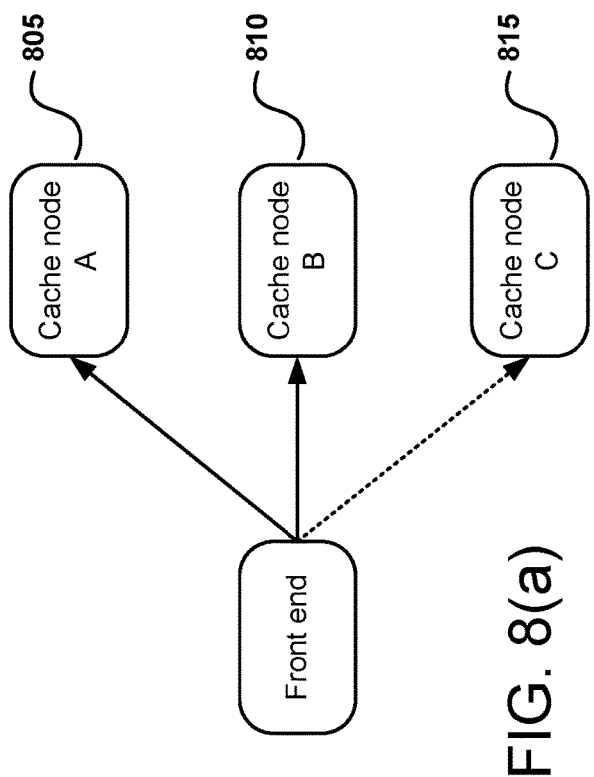
FIG. 8(a)
FIG. 8(c)

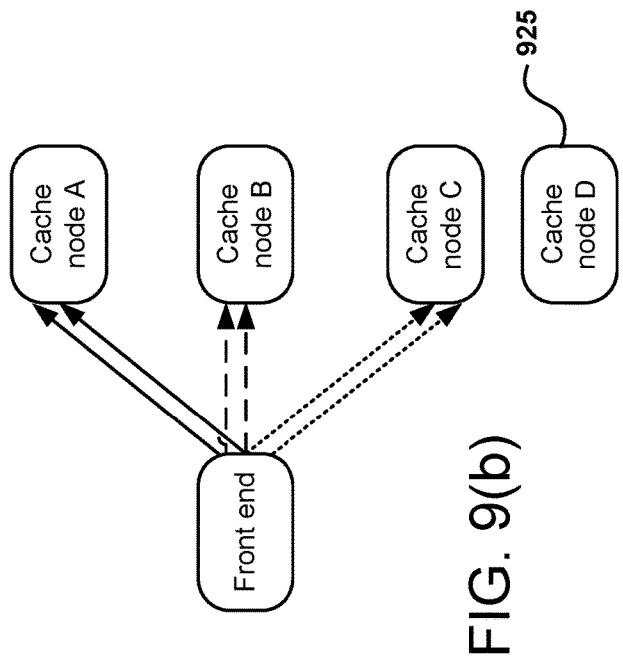
FIG. 9(b)
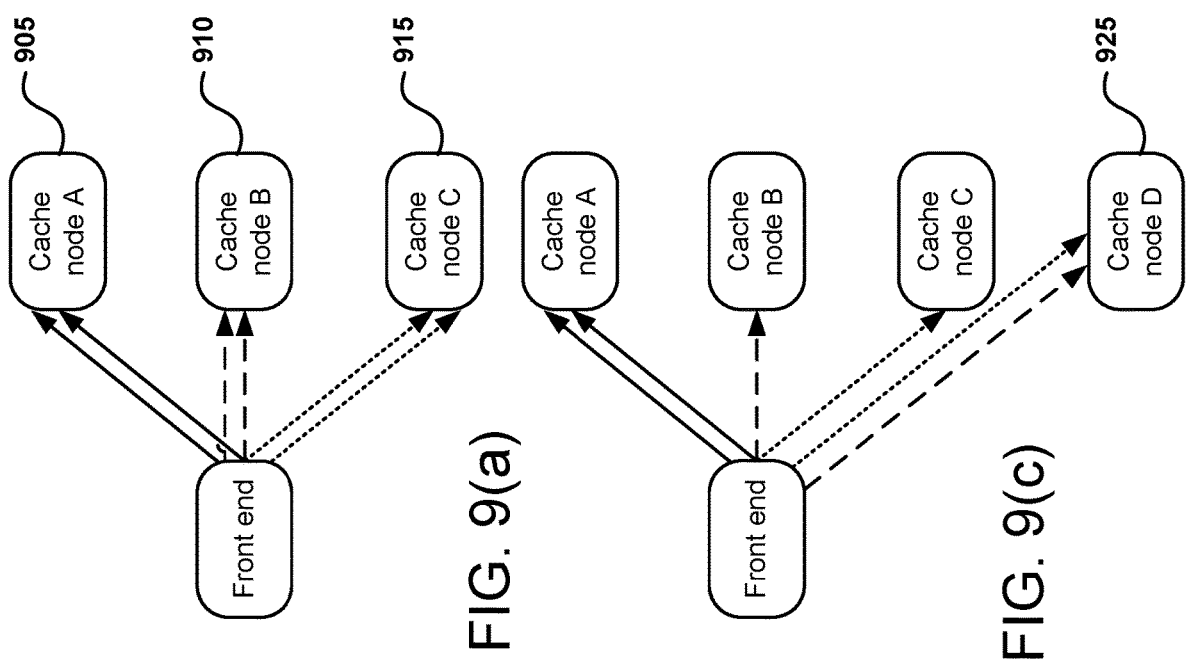
FIG. 9(a)
FIG. 9(c)

ARCHITECTURE FOR INCREMENTAL DEPLOYMENT

CROSS-REFERENCE TO RELATED APPLICATIONS

This application is a continuation of U.S. patent application Ser. No. 15/374,706, filed Dec. 9, 2016, entitled "ARCHITECTURE FOR INCREMENTAL DEPLOYMENT", and issued as U.S. Pat. No. 10,275,232 on Apr. 30, 2019, which is a continuation of U.S. patent application Ser. No. 14/708,019, filed May 8, 2015, entitled "ARCHITECTURE FOR INCREMENTAL DEPLOYMENT", and issued as U.S. Pat. No. 9,560,120 on Jan. 31, 2017, which is a continuation of U.S. patent application Ser. No. 14/274,240, filed May 9, 2014, entitled "ARCHITECTURE FOR INCREMENTAL DEPLOYMENT," and issued as U.S. Pat. No. 9,032,393 on May 12, 2015, which is a continuation of U.S. patent application Ser. No. 13/287,860, filed Nov. 2, 2011, and issued as U.S. Pat. No. 8,726,264 on May 13, 2014, entitled "ARCHITECTURE FOR INCREMENTAL DEPLOYMENT," all of which are incorporated herein by reference in their entireties.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

Applications are often developed and deployed at multiple locations such as a remote server or a cloud service provider. Deploying an application often requires bundling a collection of software artifacts and then transmitting the artifacts to a remote location. Oftentimes, a client may wish to make modifications to the remotely deployed application. In conventional systems, the client needs to upload a new copy of the application or a large collection of software artifacts that may be similar to the previous version to the remote server or the cloud service provider so that the server may be running the new version of the application. Since transmitting large artifacts may be slow due to the large file size, repeatedly uploading similar collections or successive versions of a collection of files may be inefficient, expensive, and time-consuming for the client. Moreover, the remote location may be located behind a firewall or may have other barriers preventing the transmission of artifacts. These factors may make deployments a burden to developer productivity. The burden may be magnified for developers practicing iterative or incremental development due to a need to frequently perform deployments. There is a need for faster ways to perform this transfer such that the process may be more efficient.

BRIEF DESCRIPTION OF THE DRAWINGS

Various embodiments in accordance with the present disclosure will be described with reference to the drawings, in which:

FIGS. 8(a)-8(c) illustrates an example where requests may be routed differently upon a mutation event that causes a remapping of the bucket map and/or routing map in accordance with some embodiments;

FIGS. 9(a)-9(c) illustrates another example where requests may be routed differently upon a mutation event that causes a remapping of the bucket map and/or routing map in accordance with some embodiments;

DETAILED DESCRIPTION

Figure 1:
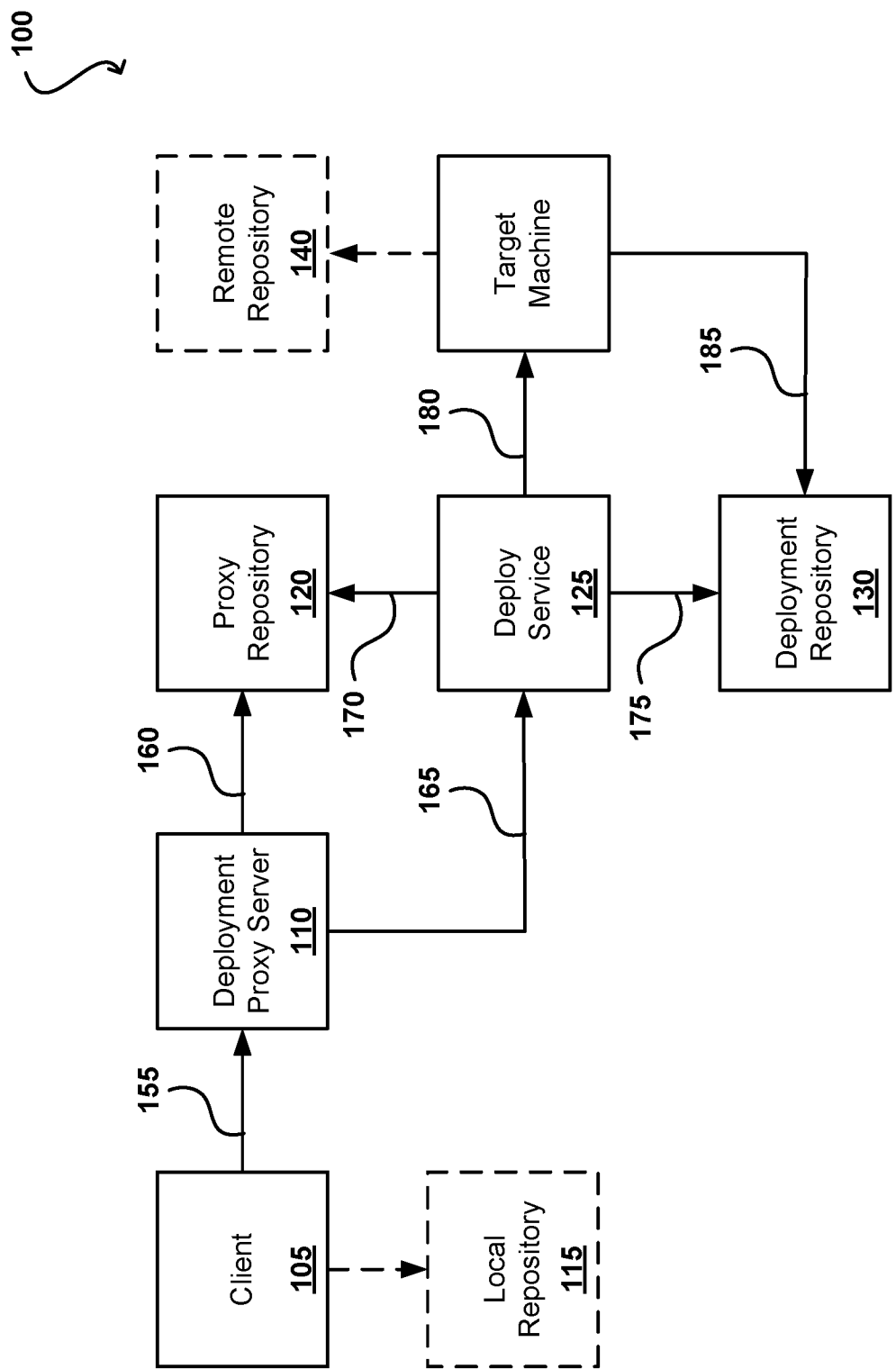
FIG. 1 illustrates an example of a system for performing one or more incremental deployments to an application installed on a target machine in accordance with some embodiments.

Systems and methods in accordance with various embodiments of the present disclosure may overcome one or more of the aforementioned and other deficiencies experienced in conventional approaches to managing data in an electronic environment. In particular, various embodiments provide a deploy system or service that determines a set of software artifacts that needs to be transmitted to a target machine upon receiving an application deployment request from a user of a client device. In some embodiments, a deploy service determines the set of software artifacts by examining the status of the application on the target machine. Some embodiments compare the application running on the target machine and the application on the client device (e.g., by comparing versions of the software artifacts that make up each application) to determine the set of software artifacts that need to be uploaded to the target machine. Incremental deployment on the target machine may thereby be performed efficiently.

In at least some embodiments, one or more applications are developed on a local client and then deployed to a remote server hosted by an Internet service provider (ISP) or a cloud service provider. An application may include a collection of software artifacts. In some instances, a user of the local client would like to copy the application or the collection of software artifacts to a remote location in a consistent fashion. Since this is typically done during development, it is inconvenient when the copying process is lengthy. For instance, the user may desire to make several changes and test run the application on a server as the changes are made to ensure that the application is working properly throughout development. When relatively small changes are made to the application within short intervals, it would be burdensome to require a complete upload of a copy of the application every single time the user wants to deploy the application, especially due to the large file sizes of applications and other transmission obstacles (e.g., firewalls).

Instead of having to transmit the entire application, some embodiments transmit only a small portion that is reflective of what has been changed between the old version of the application and the new version of the application. This enables the transfer of large files across the Internet to be more efficient. Some embodiments provide a proxy layer between a client and a service to mediate an upload request. In some embodiments, the proxy layer may be local to the service provider's side to accelerate transfers. The proxy layer may cache previous upload requests to convert an upload request from a client to a partial upload, thereby minimizing the information that needs to be transferred from the client.

Some embodiments provide a distributed cache with increased availability and performance at the expense of occasionally losing data or returning incorrect data. In some embodiments, the distributed cache may contain copies of software artifacts from prior upload requests, along with reference identifiers associated with the software artifacts. Upon determining that one or more software artifacts in the distributed cache or the cache storage is an older version of the software artifacts on the client device (e.g., by comparing the respective reference identifiers for each software artifact), the client may provide a partial upload that transforms the one or more software artifacts from an older version to a newer version (e.g., by providing a difference file encoding the changes from the older version to the new version, or by providing a complete new copy of the software artifact).

Various other functions and advantages are described and suggested below as may be provided in accordance with the various embodiments.

FIG. 1 illustrates an example of a system 100 for performing one or more incremental deployments to an application installed on a target machine in accordance with some embodiments. Some embodiments enable a client device to deploy an application or a collection of software artifacts (e.g., developed on the local client device) to a target machine (e.g., hosted by an ISP or a cloud service provider) that may be remote to or inaccessible by the client device. During application development, a developer of an application may make incremental changes to an application stored locally on the client device and may desire to run the application on the target machine as the changes are made to ensure that the appropriate changes are applied. Instead of uploading the entire application every single time a change is made, the client of some embodiments enables the target machine to determine one or more software artifacts that the target machine lacks and deploys the determined software artifacts to the application running on the target machine.

In this example, the client 105 sends an upload request to a deployment proxy server 110 at 155. The client system is where a user of the client performs local application development. The local development may be stored in a local repository 115 stored on the local system. In some embodiments, the client uploads one or more software artifacts to the deployment proxy server along with the upload request. The one or more software artifacts may be a partial update to an application installed on a target device. In some instances, the one or more software artifacts are a full update of all of the software artifacts that make up the application. Some embodiments enable the client to determine the one or more artifacts that may have been updated by the client or that may be unknown to the target device by consulting a local repository 115 of software artifacts to the client device.

The deployment proxy server 110 stores the received software artifacts at a proxy repository 120 at 160. In some embodiments, the software artifacts stored in the proxy repository may disappear over time (e.g., because the proxy repository is full, or because the deployment is complete). In some embodiments, the client utilizes a communication mechanism to interact with the deployment proxy server and determine the set of software artifacts that need to be stored in a proxy repository for the update. In some embodiments, the client can deploy one or more updates to the application installed on the target machine. When the client desires to deploy a partial application or a full application, the client negotiates with the deployment proxy server to determine exactly which software artifacts are needed by the client in order to perform the upload.

In instances where multiple clients can deploy updates to the application, the order or current state of the target machine may not be in a consistent order or state known to each of the client devices. In some embodiments, the deployment proxy server may signal the client that additional software artifacts are needed to complete an update because, for example, information was lost from the proxy repository. The proxy repository may lose information between deployments because the deployment proxy server may delete software artifacts from the proxy repository after a deployment is complete. The received signal may override the client's knowledge about the state of the application on the target machine.

In some embodiments, the deployment proxy server determines a continuation deployment action based at least in part on the client's upload request. After software artifacts have been transferred to the deployment proxy server, the continuation deployment action is executed to take advantage of the uploaded software artifacts for application deployment. In one example, the deployment proxy server parses the request uniform resource locator (URL) to determine the name of an application that is the target of this deployment. In another example, the deployment proxy server parses an HTTP request header to determine the URL of a machine environment to update.

In a further example, environment information describing the environment that is being updated (e.g., properties about the target machine, the client, the application being updated) may be encoded in the URLs used for communication between the client and the deployment proxy server. The deployment proxy server might have a base address at which it listens and have sub-paths for the application name and the environment as components of the URL where the content is being received. Based on the continuation deployment action, the deployment proxy server 110 forwards the client's upload request to a particular deployment service 125 capable of performing the deployment action at 165.

In some embodiments, the deployment service is a set of deployment services for which the deployment proxy server knows the address. The address of the deployment service might be communicated through the continuation action specified by the client. For example, the client might embed the address of the deployment service in the communication with the deployment proxy server. Once the deployment proxy server is able to contact the deployment service, the deployment proxy server may notify the deployment service of an update that is ready to be performed on behalf of a particular user. In some embodiments, the deployment service receives the location of the proxy repository as part of the communication request and receives instructions on the set of artifacts or the application bundle that is necessary for the deployment service to retrieve from the proxy repository for its operation.

The deployment service 125 sends a request for an application bundle from the proxy repository 120 at 170. The application bundle may contain a full update for all software artifacts in the application. In some embodiments, the deployment service retrieves the complete collection of software artifacts or the complete version of the application bundle from the proxy repository. The complete version of the application including all the software artifacts is assembled in the proxy repository (e.g., upon being directed by the deployment proxy server) and made available for the deployment service, although the client may have only requested a partial update from the deployment proxy server.

The proxy repository may use the request for the application bundle as a signal that the deployment is complete and delete or clean up information in the repository. For example, upon receiving the request for an application bundle from the deployment service, the proxy repository may delete some or all of the history for the requested deployment. Some embodiments include more than one deployment services connected with the same deployment proxy server. For example, a first deployment service can handle a certain type of application or communicate with a certain set of target machines while a second deployment service can interface with different applications or communicate with a different set of target machines.

The deployment service 125 stores the application bundle or the complete collection of software artifacts in a deployment repository 130 at 175. In some embodiments, the deployment repository is operable to receive requests to retrieve software artifacts for the application. Having a separate deployment repository from the proxy repository enables additional requests to come in from the client without the requests interfering with the ongoing deployment operation. The deployment repository may provide consistency and atomicity guarantees such that further deployments for other applications or even the same application do not interfere with the function of the deployment repository. In some embodiments, the deployment repository may be part of the proxy repository. If the proxy repository can handle multiple requests coming in while being able to consistently serve a complete copy of the application to the deployment service, the proxy repository and the deployment repository may operate in some shared fashion.

The deployment service 125 sends a notification to the target machine 135 at 180 to inform the target machine that software artifacts are ready for deployment. In some embodiments, the deployment service sends the notification by connecting to the target machine through a network connection (e.g., by opening a TCP or HTTP connection). A listener may be installed on the target machine for a network server that is able to receive requests from the deployment service informing the target machine that an application is ready to be deployed. The request may specify the location of the deployment repository and indicate the operations that the target service should perform.

In many cases, the deployment service is unable to directly contact the target machine, such as when the target machine is behind a firewall and unable to accept incoming connections. In some embodiments, the target machine may contact a particular deployment service periodically. Some embodiments enable the target machine to communicate with the deployment service indirectly, such as by having the target machine poll a location at which the deployment service can rendezvous with the target machine. In other words, the target machine may make polling requests to a location to which the deployment service can write a message notifying the target machine of the deployment. For example, there might be a shared queue (e.g., implemented by a web service) to which the deployment service may write a request. The target machine may then read the request from the shared queue.

The target machine 135 requests one or more software artifacts from the deployment repository 130 at 185. In some instances, the one or more software artifacts include a partial update. In some embodiments, the target machine determines the software artifacts needed in order to perform the application update. The target machine may already have an older version of the application; therefore, the target machine may analyze its local configuration to determine which software artifacts are needed for downloading onto the target machine. The target machine may determine which software artifacts need to be updated or retrieved by analyzing the deployment request in some embodiments. In some embodiments, the target machine may inform the deployment server of its local configuration (e.g., the current state or version of application) and enable the deployment server to determine the software artifacts needed in order for the target machine to deploy the update.

In some embodiments, the target machine may consult a remote repository 140 of software artifacts to determine one or more artifacts that may have changed or that is unknown to the deployment proxy server. Alternatively, the one or more software artifacts may comprise a full update of all of the software artifacts in the application. Upon retrieving the one or more software artifacts (e.g., the complete collection of software artifacts), the target machine updates the deployed copy of the application using the requested artifacts. The target machine may install that collection of artifacts side-by-side with the existing application. The target machine may download artifacts in an isolated directory independent from the application that is currently deployed. Once the download for all the artifacts is complete, the location that it is pointing to will be swapped to the existing application. For instance, in the case where there are two parallel directories including one directory that is storing the existing application and one directory storing the download location, the pointers to the two locations will be swapped once the download is complete so that the server is now running the new version of the application instead of the old version of the application.

The one or more software artifacts uploaded as a partial update by the client to the proxy repository may be different than the one or more software artifacts downloaded as a partial update to the target machine. In some embodiments, the software artifacts uploaded to the proxy repository may be a subset of the software artifacts downloaded to the target machine or vice versa.

Figure 2:
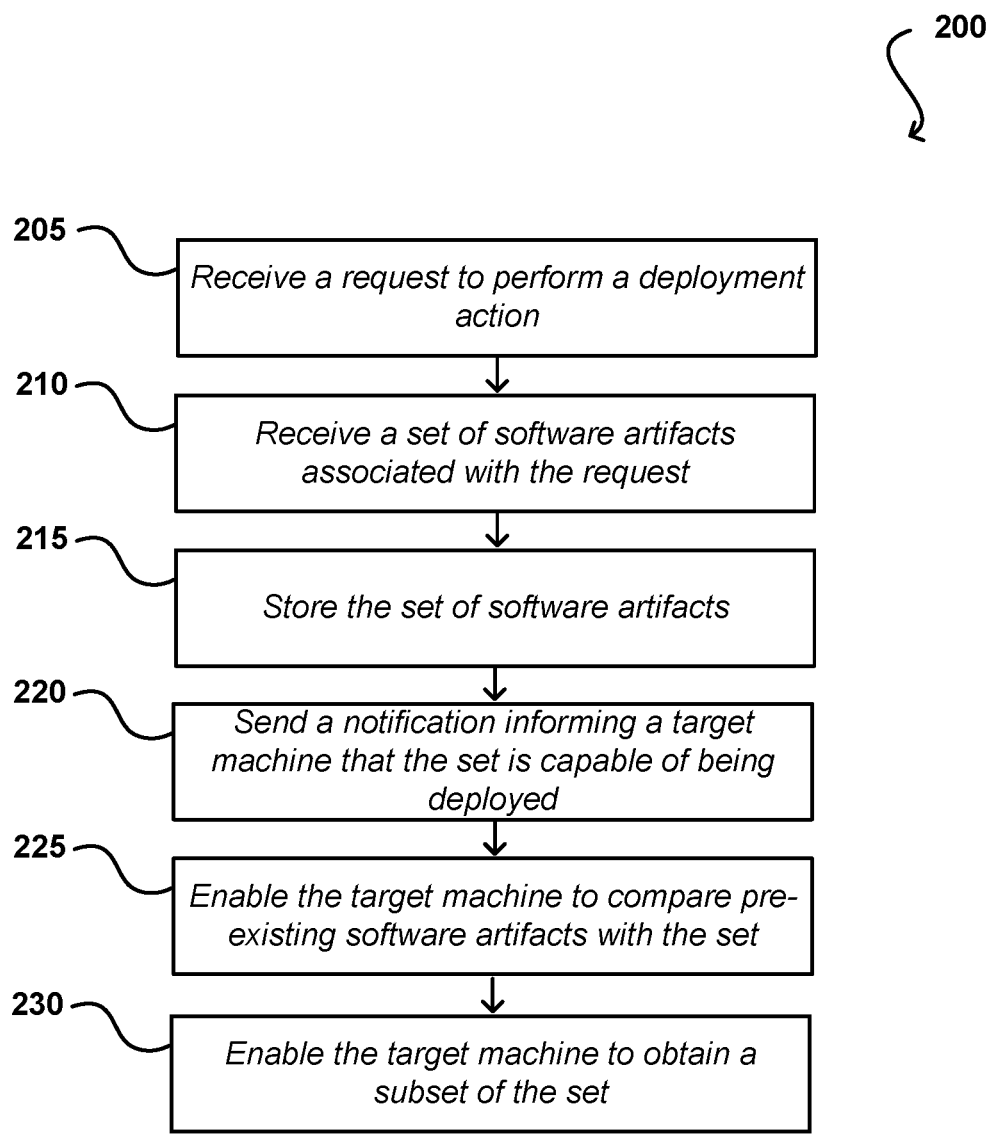
FIG. 2 illustrates an example of a process for performing incremental deployment of an application on a target machine in accordance with some embodiments.

FIG. 2 illustrates an example of a process 200 for performing incremental deployment of an application on a target machine in accordance with various embodiments. In this example, a request to perform a deployment action is received from a deployment proxy server 205. A set of software artifacts associated with a client request is received from a proxy repository 210. The set of software artifacts is stored on a deployment repository 215. A notification that the set of software artifacts is capable of being deployed on the target machine is sent to a target machine 220. Information that enables the target machine to compare software artifacts pre-existing on the target machine with the set of software artifacts is provided to the target machine such that the target machine may selectively retrieve a subset of software artifacts from the set of software artifacts 225. The target machine is enabled to obtain the subset of software artifacts 230.

Figure 3:
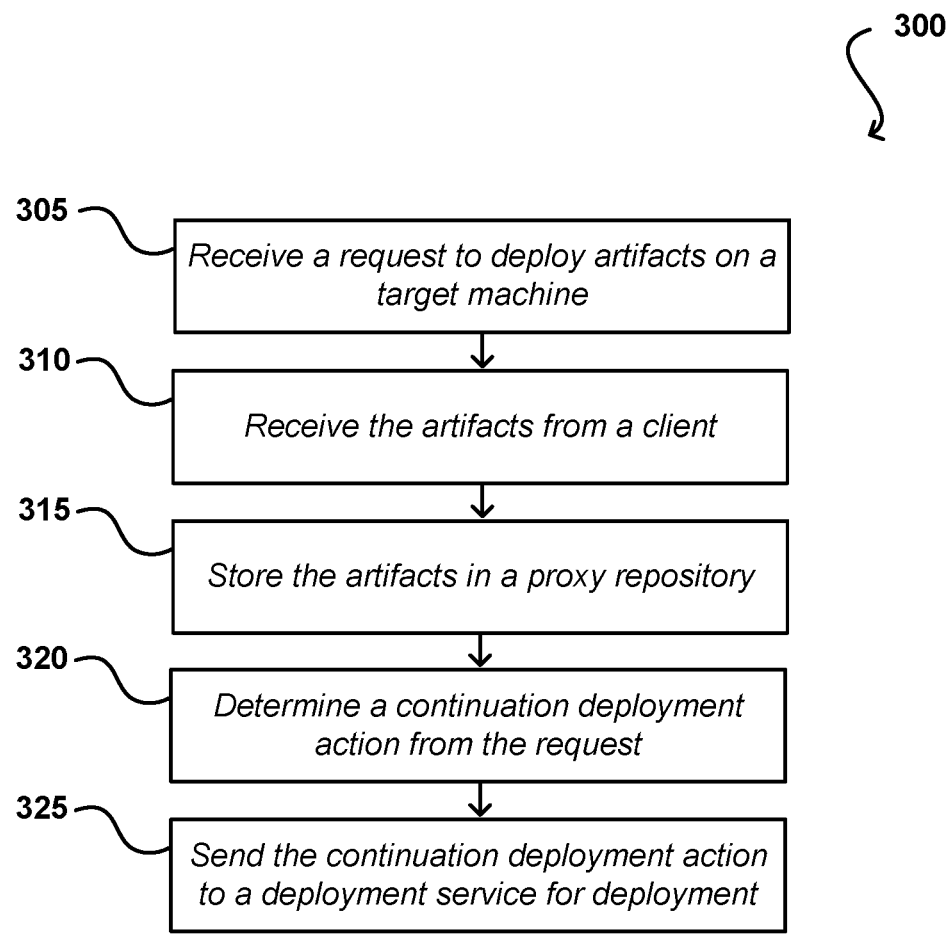
FIG. 3 illustrates an example of a process for performing incremental updates to an application in accordance with various embodiments.

FIG. 3 illustrates an example of a process 300 for performing incremental updates to an application in accordance with some embodiments. In this example, a request to deploy one or more software artifacts on a target machine is received from a client machine 305. The one or more software artifacts are received from the client 310. In some embodiments, the one or more software artifacts may be a subset of software artifacts that is less than the complete set of software artifacts on the client. The subset of software artifacts is stored in a proxy repository 315. A continuation deployment action is determined using the received request 320. The continuation deployment action is sent to a deployment service capable of performing the deployment action 325. In some embodiments, the deployment service is specified by the client's request and may be determined based at least in part on the continuation deployment action.

Figure 4:
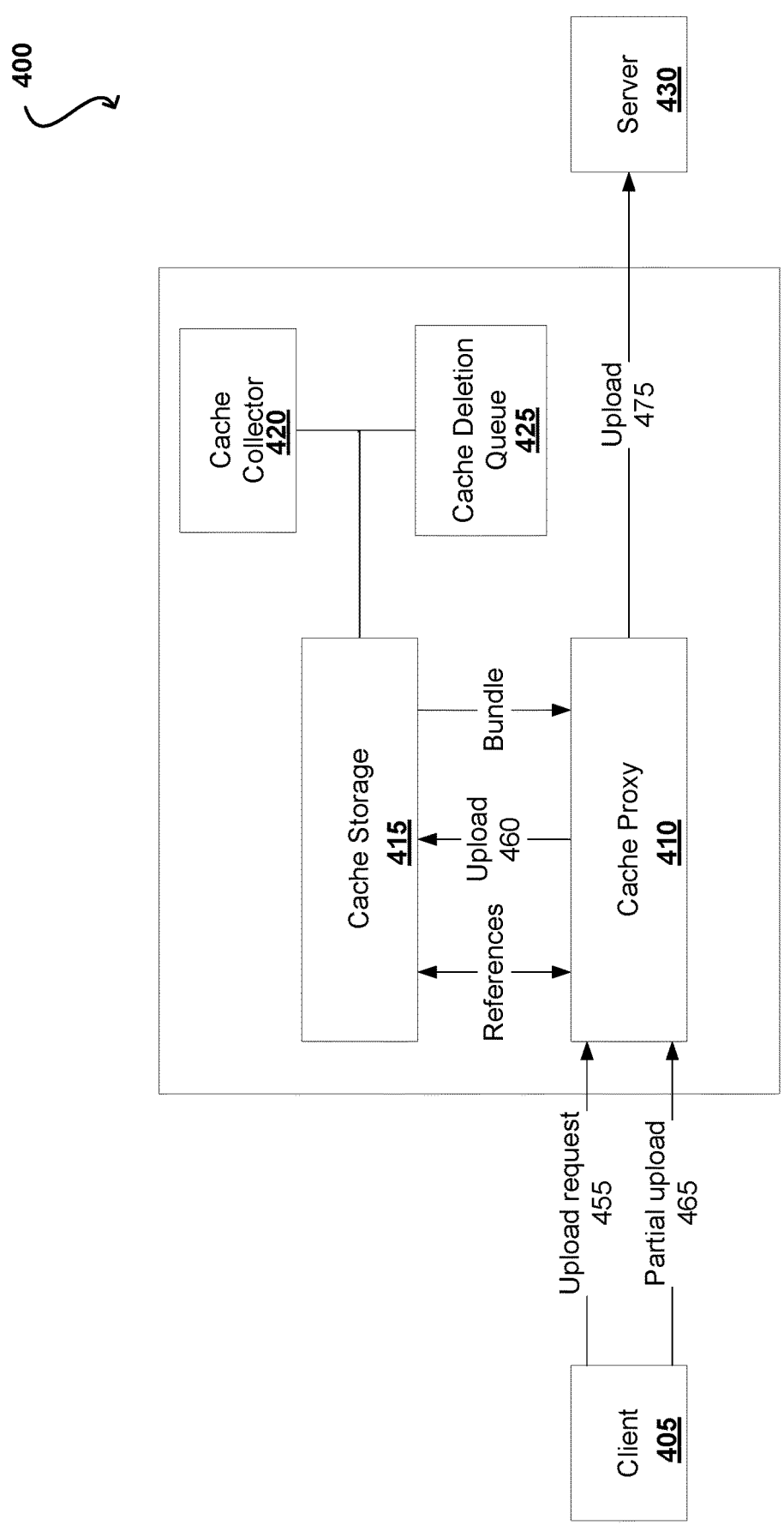
FIG. 4 illustrates an example of an operation flow for uploading one or more collections of software artifacts to a service in accordance with some embodiments.

FIG. 4 illustrates an example of an operation flow 400 for uploading one or more collections of software artifacts to a service in accordance with some embodiments. Some embodiments provide a proxy layer between a client and the service to mediate the upload request. The client system may have a collection of software artifacts that typically needs to be transmitted to the service or the server system upon each upload request. The proxy layer may reduce the amount of transfer that needs to be performed by the client to the server system in some embodiments.

In some embodiments, the proxy layer is located nearer to the service than the client and may possess greater upload bandwidth than the service. Some embodiments enable the proxy layer to cache previous upload requests. The proxy layer may thereby convert an upload request for a collection of software artifacts from a client to a partial upload. Using the previously stored content, the proxy layer may then produce a full upload from the partial upload to present to the service.

In this example, the client 405 sends an upload request to a cache proxy 410 at 455. In some embodiments, the cache proxy is a network component (e.g., a Web proxy) operable to receive requests from the client and operable to send requests to the server upon performing a transformation to the client's request. The upload request may indicate the client's intent to upload one or more software artifacts to a destination service. In some embodiments, the upload request identifies the destination service and provides one or more reference identifiers associated with the one or more software artifacts that a user of the client would like to upload. A reference identifier may identify a software artifact by a hash function (e.g., a SHA1 hash), a timestamp, a GUID, or some other means that enables one to distinguish one software artifact from another.

In some embodiments, the cache proxy supports a transparent proxy mode for upload requests. The client may make an upload request without it being aware of the cache proxy intermediary and while believing that it is directly communicating with the service. The cache proxy may recognize that the client is making a transparent proxy upload request, for example by noting that the upload request has a different format than a request directed to the proxy, and forward the upload request to the service on behalf of the client. In some embodiments, the cache proxy may determine whether the upload request is a partial upload request or a full upload request based on the format of the message(s) (e.g., a particular byte sequence or similar identifiers within the message format that may distinguish a partial upload request from a full upload request) or the message protocol that is used for communicating between the client and the cache proxy. Supporting a transparent proxy mode may provide benefits such as backwards-compatibility with older clients that have never encountered this system technology. The cache proxy while operating in transparent proxy mode may still extract software artifacts from the upload request and insert the software artifacts provided by the upload into the cache.

The cache proxy 410 consults a cache storage 415 to determine whether the cache storage contains an up-to-date copy of each of the set of artifacts that the client would like to upload at 460. In some embodiments, the cache storage contains prior information related to the artifacts (e.g., from an initial upload made by a client prior to the upload request). For example, the cache storage may contain an up-to-date copy of the artifact and provide a reference identifier for the artifact matching the reference identifier known by the client (e.g., both identifiers indicating that the client and the cache storage have the latest version). Alternatively, the cache storage may not contain a copy of the artifact and provide a null reference identifier for the artifact indicating that it has no content.

In some embodiments, the cache storage may contain an old copy of the artifact and provide a reference identifier for the previous version of the artifact. The client may recognize the old identifier and support a transformation that converts the old version of the artifact to a newer version of the artifact. For example, the client may determine the difference or what it needs to upload based on the identifiers and provide a difference file encoding the changes from the old version to the new version. In some embodiments, the client may simply provide a complete new copy of the artifact (e.g., upon determining that the delta is too difficult to compute).

The client 405 provides a partial upload of one or more software artifacts to the cache proxy 410 at 465. In some embodiments, the client identifies one or more software artifacts for which the cache storage does not contain an up-to-date copy of the artifacts and transforms each of the software artifacts from an older version to a newer version of the software artifact. The client may provide a partial upload by determining the reference identifiers for the one or more software artifacts, sending the reference identifiers along with new versions of each of the corresponding software artifacts. For example, some embodiments may concatenate a list of the reference identifiers with a number of attachments including software artifacts corresponding to the reference identifiers into the body of an HTTP request that may then be sent to the cache proxy.

The client may identify the one or more software artifacts for which the cache storage does not contain an up-to-date copy by performing a comparison between the hashed content on the client and the cache storage. The client may run a hash algorithm on the content or application stored locally to obtain a particular identifier. The identifiers of each software artifact on the cache storage may be determined (e.g., based on previous upload requests). In some embodiments, the client may obtain one or more identifiers from the cache storage and compare the received identifiers with a record including previous versions of the content to identify the version of the content in the cache storage. The client may then compute a difference between the content version on the client and the content version on the cache storage. Another way for the client to identify the difference between the content stored on the client and the content stored on the cache storage is by actually storing older copies of the content that is uploaded and performing a comparison.

In some embodiments, the cache proxy may unpack the partial upload received from the client. The cache proxy may update the cache storage by applying the transformations included in the partial upload. In some embodiments the cache proxy may store an old version of the software artifact and the new version of the artifact side-by-side, along with their respective reference identifiers. Storing multiple versions of an artifact may improve the likelihood of identifying a compact transformation during subsequent upload requests. Additionally, storing multiple versions of an artifact may facilitate use of the cache proxy by multiple clients. For example, a first client may be uploading an older version of a software artifact while a second client may be uploading a newer version of the same software artifact.

Performing de-duplication of artifacts between users may increase the efficiency of the cache storage space. If every client held their own isolated copy of the cache storage, then the same file may be redundantly stored over and over again despite there being some common files that many people in the organization have used. Therefore, de-duplication may be particularly important for the efficiency of this storage where the system would like to recognize files that may be the same or equivalent (e.g., same version) regardless from which client the file is coming.

The cache proxy 410 may produce a full upload bundle from the partial upload at 470. The full upload bundle may include a complete copy of each artifact included in the upload request. In some embodiments, the cache proxy may populate the upload bundle using an up-to-date version of each artifact drawing from both the partial upload and the cache storage.

The cache proxy 410 may transmit the full upload bundle to a service 430 at 475. The service may be configured to receive the complete collection of artifacts. In some embodiments, an upload request may be sent to the server on behalf of the client. A first cache proxy may produce a full upload bundle to upload to a second cache proxy. The first cache proxy may issue an upload request to the second cache proxy prior to transmitting the full upload bundle. Responsive to the reference identifiers provided by the second cache proxy, the first cache proxy may provide a partial upload to the second cache proxy, the partial upload based at least in part on the provided reference identifiers and full upload bundle, rather than transmitting the full upload bundle.

Subsequent to the transfer of the full upload bundle to the cache proxy, a cache collector 420 may schedule a software artifact in the cache storage for deletion. The cache collector may schedule to delete one or more software artifacts in the cache storage when a user or artifact may have exceeded a quota limit for use of cache storage. For example, a particular user may be given one hundred megabytes of data storage in the cache. Once the size of the data exceeds the limit, some embodiments delete some of the old data or all of the data. In another example, the user may be given a quota limit for storing multiple versions of software artifacts where older versions are rotated out once the quota has been exceeded.

In some instances, the cache collector may schedule to delete one or more software artifacts in the cache storage when the cache storage is approaching its capacity limit or has exceeded a capacity threshold. In some embodiments, the cache collector or a monitoring component may identify the least-recently used software artifacts in the cache storage. In some embodiments, the cache collector may then schedule the one or more software artifacts that have not been used in the recent past for deletion by placing the software artifact in a cache deletion queue 425. The cache storage may periodically process the cache deletion queue by deleting one or more of the queued artifacts and removing those artifacts from the queue.

One of the reasons for periodical sweeping the cache deletion queue as opposed to immediately deleting the software artifacts when an item is eligible for deletion is that these delete requests are going to be contentious in terms of system resources (e.g., disk throughput) with the normal operation of the cache. For example, available resources may be occupied when a read or write request is being performed. Therefore, postponing the deletion of the software artifacts until the system is seeing less usage for those artifacts allows the system resources to be available to perform other tasks. The system may perform the deletions or maintenance in the middle of the night or some other period when the load is low and only perform aggressive deletions in an immediate fashion when space is running low.

Figure 5:
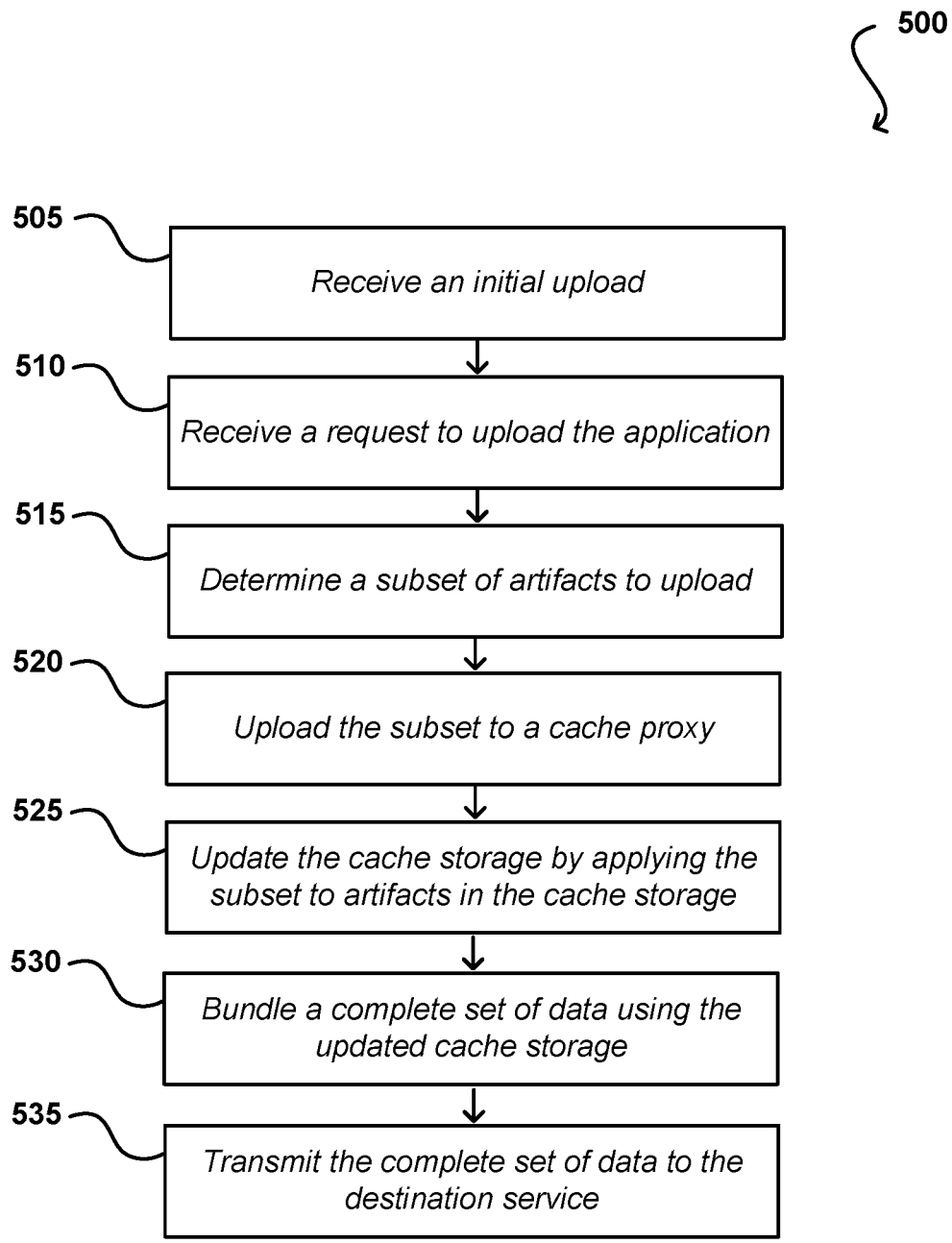
FIG. 5 illustrates an example of a process for uploading at least one software artifact to a service in accordance with some embodiments.

FIG. 5 illustrates an example of a process 500 for uploading at least one software artifact to a service in accordance with some embodiments. In this example, an initial upload is received 505. In some embodiments, the initial upload includes one or more software artifacts that make up an application. A request to upload the application to a destination service is received from a client 510. The request includes information indicating the destination service and a set of reference identifiers associated with each of the software artifacts of the application. A subset of software artifacts to upload is determined 515. The subset of software artifacts is determined based at least in part on a difference between the set of reference identifiers and corresponding reference identifiers associated with the one or more software artifacts received from the initial upload. The subset of software artifacts is uploaded to a cache proxy to incorporate the subset with the one or more software artifacts in the cache storage 520. The cache storage is updated by applying the subset to the one or more software artifacts in the cache storage 525. A complete set of data is bundled using the updated cache storage 530. The complete set of data includes a complete copy of each of the set of software artifacts. The complete set of data is transmitted to the destination service 535.

Figure 6:
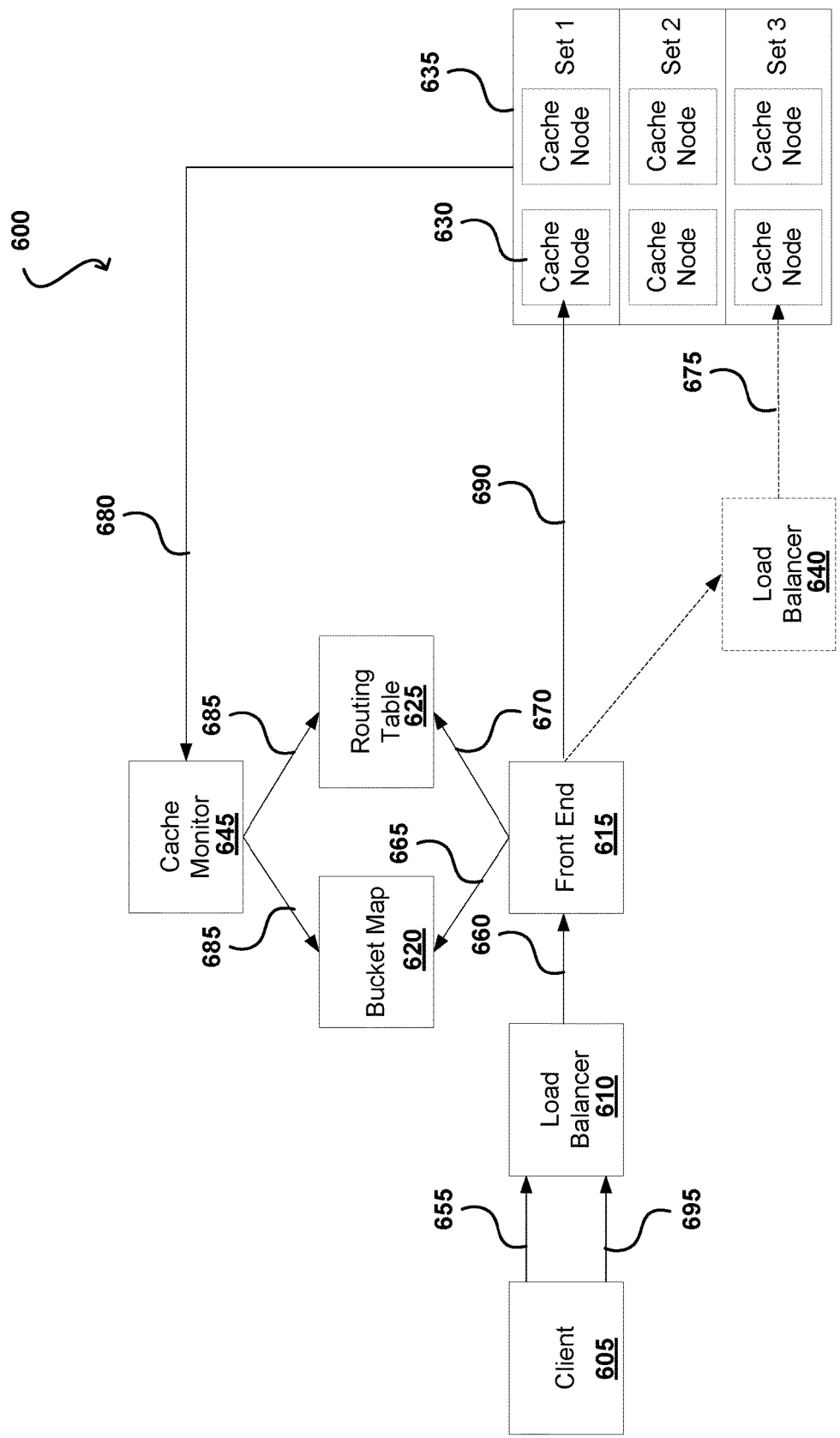
FIG. 6 illustrates an example of a system for performing a caching operation that can be utilized in accordance with various embodiments.

FIG. 6 illustrates an example of a system 600 for performing a caching operation that can be utilized in accordance with various embodiments. In some embodiments, the caching operation may be performed in a distributed cache system utilizing a distributed cache that is highly available and resilient to failures at the expense of occasionally losing data or returning incorrect or inconsistent data. In this example, a client 605 issues a caching request (e.g., a read request, a write request) to a load balancer 610 at 655. The client component may be an end user system which has data that the user of the client would like to store or retrieve from the cache. The load balancing component is operable to distribute the client request among any number of front end nodes that have the same or similar configuration. In some embodiments, a caching request such as a write request may include a cache key that identifies a particular location (e.g., within a set of cache nodes) to which a user may wish to write and a cache value that includes the content that the user wishes to write to the particular location.

The load balancer 610 selects a front end 615 from among several cache front ends to forward the request at 660. In some embodiments, the load balancer selects a front end among several cache front ends using a random process (e.g., a round-robin distribution of requests), a fair process (e.g., selecting the front end with the least load or least traffic going through the front end), or a biased process (e.g., preferring some front end instances over other front end instances). In one instance, the load balancer may select the front end that is closest to the client. In another instance, the load balancer may determine the front end instances that are within a threshold geographical distance of the client and select the front end with the least load from the front end instances.

The front end uses a bucket map and a routing table to select a cache node among a set of cache nodes. In some embodiments, the front end determines how to route the request to one of the back-end cache endpoints based at least in part upon the cache key associated with the caching request. In this example, the front end 615 consults a bucket map 620 to identify an identifier or a bucket (e.g., in a partitioned identifier space) corresponding to the cache key at 665. For instance, the bucket map may map the cache key to an integer in the range of 0 to 1023. In some embodiments, the identifier space is 50-500 times larger than the number of active cache nodes.

The front end 615 may then consult a routing table 625 at 670 to select a cache node 630 from a set of cache nodes 635 based on the mapped bucket 620. In some embodiments, the routing table may be implemented by a small distributed key-value store. Some embodiments implement the routing table as a service. For example, the routing table may be a web service to which the front end connects. The routing table may have an end point over a protocol (e.g., HTTP, HTTPS) that the front ends know how to reach where the front end may send a message to the routing table requesting the cache location for the particular bucket ID.

In the event that there are multiple clients that use the same key identifier names, some embodiments apply a namespace such that the identifier names for different clients do not collide. In some embodiments, the key identifier name may be modified such that the key identifier would be scoped to a particular client or set of clients. In some instances, multiple clients may be part of a global namespace such that everyone shares the same name without the key identifiers being modified. Some embodiments transform the identifiers from different clients into a namespace form, which can be mapped to a numerical value within a range. As mentioned, the identifier range may be determined based on the number of cache nodes. Upon transforming the identifier, some embodiments determine a corresponding cache node in the routing table, the cache node being in a particular location that is identifiable by a URL for the cache node.

In the event that the routing table service is not available, some embodiments may randomly distribute the traffic among different cache nodes. In one embodiment, the cache nodes 635 are placed behind a load balancer system 640. In the event that the routing table is unavailable, the front end may request the load balancer 640 to select one of the cache nodes from the set of cache nodes to route the request at 675. In some embodiments, the load balancer may select a cache node that may probabilistically be the correct location.

Some embodiments may store historical information (e.g., information about past distribution of information) on the front end such that the same cache node may be selected from the last time that the particular client sent the request. By creating a temporary in-memory association of the client-node pairing, the front end may attempt to pin requests from a particular client (e.g., based on the IP address of the client, a session identifier, or other client identifiers) to the selected cache node rather than use the load balancer 640 on successive requests. For instance, some embodiments may send the request to the previously selected cache node rather than performing a random selection the second time that the same client visits. Some embodiments associate a client with a particular set of cache nodes for a threshold period of time.

Further, some embodiments use a previously cached copy of the routing table if the routing table service is unavailable. In some embodiments, the routing table may be shared among a small number of front ends by being physically replicated such that each front end may have access to a copy. The front end may cache a copy of a portion or all of the routing table entries for a period of time (e.g., thirty seconds, two minutes) to continue routing requests even when the routing table is unavailable. For example, a first request that comes in to that front end might attempt to contact a routing table service through a protocol. Some embodiments may push a copy of the routing table to each of the nodes on a periodic basis such that in the event that the routing table service is unavailable, some embodiments may fall back to the potentially outdated but locally cached copy (e.g., after attempting but failing to contact the routing table service).

Upon the selection of a cache node, the front end 615 may forward the caching request (e.g., write request) to the selected cache node 630 at 690. The cache node may then process the caching request. The cache nodes may be durable in the sense that the cache nodes will outlive this particular caching request. In some embodiments, the selected cache node may be a single direct-mapped machine while in some embodiments the selected cache node may be a set-associative collection of machines or a set-associative cache.

A request may be satisfied by replicating the data among different cache nodes. For example, a write request may be directed to the set of associative caches where multiple cache nodes receive the write request and thereby cause the multiple cache nodes that received the write request to perform the write operation. Similarly, if multiple cache nodes received a read request, they will all attempt to fulfill the read operation. In some embodiments, the front end may determine if it receives multiple read responses and which of those responses to return to the client. The front end may select to read from one of the cache nodes. This replicated approach increases the reliability of the system such that the data would still be available even if one of the cache nodes failed. Some embodiments enable one or more nodes within the set of nodes to which the write request is directed to perform the write request. For example, even though the read request may go out to all the nodes, potentially only one of those nodes may have the cache data. Therefore, the node that has the cache data may be determined to respond.

The machine or collection of machines may adjust their state to perform the write request. In this example, a cache monitor 645 may detect a mutation event for the set of cache nodes 635 at 680. A mutation event occurs when at least one of the cache nodes in the set of cache nodes fails, when at least one of the cache nodes is experiencing higher than tolerable load, when one or more new cache nodes may be added to the set of cache nodes, etc. The cache monitor determines when there is a mutation event that occurs among the set of cache nodes.

In some embodiments, the cache monitor monitors the status of the cache nodes and determines whether the cache nodes are available and "healthy" or functioning in a normal operational state. A "healthy" cache node may be a cache node that is able to correctly process incoming caching requests (e.g., read request, write request) and respond to them in a timely fashion (e.g., within a threshold duration). A cache node may be deemed "unhealthy" when it is failing to process a request or when it is processing the request slowly (e.g., taking more than a threshold duration to process the request).

In some embodiments, the cache monitor detects whether the cache nodes are "healthy" by periodically polling the set of cache nodes and looking for a particular response. For example, the cache monitor can perform tests or canary operations to ensure that the cache nodes are responding in a certain way. In some embodiments, the cache monitor can detect the "health" of the system by looking for heartbeat requests. Each of the cache nodes may periodically (e.g., every 30 seconds) contact the cache monitor to inform the cache monitor that the cache node is a "healthy" cache node. If the cache monitor does not receive a response for a particular interval, then the cache monitor may determine that the cache node is an "unhealthy" cache node in some embodiments.

As mentioned, the cache monitor may detect a mutation event upon detecting a new "healthy" cache node that would like to be a part of the collection of cache nodes or upon determining that a previously "healthy" cache node is now "unhealthy." In this example, upon detection of a mutation event, the cache monitor 645 modifies the bucket map and/or the routing table at 685. The cache monitor of some embodiments updates the bucket map and routing table such that the entries within the set of maps are reflective of the new set of "healthy" cache nodes. The cache monitor may update the routing table such that buckets that were originally mapped to a failed cache node may be rerouted to cache nodes that are still in service. For example, some embodiments update the routing table and the bucket map when cache node 3 out of cache nodes 1, 2, and 3 has become "unhealthy." The cache monitor may update the routing table and the bucket map such that only cache nodes 1 and 2 are pointed to. In some embodiments, the cache monitor increases or decreases the number of buckets in order to preserve the desired ratio of buckets to cache nodes.

Some embodiments avoid unnecessarily modifying the routing maps to attempt to preserve existing mappings while still trying to redistribute the routing table such that the mutation events are taken into account. For example, if a request that is previously pointed to cache node 2 which is still healthy is changed to instead point to cache node 1, then it will look as if the cache node had lost the data because the desired value would remain in the original location. In the event that a cache node within the set of cache nodes is determined to be "unhealthy," the routing table entries are re-mapped to be pointing in some fair fashion among the cache nodes that are still "alive" or "healthy." Some embodiments may evenly distribute the load among the cache nodes that are still "surviving" by looking at the number of routing table entries to which each cache node is mapped. In some embodiments, the load may be evenly distributed by analyzing the historical record of caching requests and determining the routing table entries that have less traffic going through. Some embodiments weigh the number of entries to which each cache node is mapped and the frequency of the read and write requests for those entries to determine how to evenly distribute the load.

In the event that new "healthy" cache nodes are added to the set of cache nodes, routing table entries that were pointing to perfectly healthy cache nodes may now be directed to point at the new cache nodes. In such a situation, flapping may occur as cache nodes go in and out of the system and the routing table is re-mapped back and forth. Some embodiments prefer to maintain relative stability in terms of the migration of cache nodes over time. So if a cache node is generally staying up and running for a long period of time, the routing table entries that point to it should also be relatively stable and unchanging or changing in a small fashion over time.

Some embodiments give the new cache node that has just come on line fewer routing table entries than the other cache nodes. For example, some embodiments may redirect a small number of buckets that have not been recently used for those cache nodes to the new cache node. That would potentially minimize the number of incorrect routes while still giving the cache node some traffic. Some embodiments use the mechanism of waiting for other cache nodes to fail as the primary mechanism for shifting load on to that new cache node. A small amount of traffic is directed to new cache nodes as they come online and a relatively larger proportion of traffic may be shifted over as other cache nodes die. This ensures that over time the load on the cache nodes may be balanced.

In some embodiments, modifying the bucket map and/or the routing table may orphan cache nodes/values. For example, a write request for a particular cache key may be issued to a different cache node after the bucket map and/or the routing table is modified. In another example, a read request for a particular cache key may be issued to a cache node holding an older version, outdated, or irrelevant cache value after several modifications have been made to the bucket map and/or the routing table. In some embodiments, the cache monitor may attempt to modify or calculate the bucket map and/or the routing table in a way that would minimize the number of orphan cache nodes/values. For instance, the cache monitor may calculate a new function for the bucket map using a perfect hashing algorithm such that the majority of cache keys would be placed in the same bucket as in the original unmodified bucket map.

Perfect hashing is a way of completing or finding a hash function such that certain values of the hash function are predetermined. For example, some embodiments may specify to have a set of keys mapped to a set of values but allow flexibility in the mapping of other undefined values. Since the hash function may be very expensive to compute, some embodiments accept a hashing algorithm that is approximately perfect and that attempts to satisfy as many desired placements as possible but will essentially have a penalty function for how many desired placements are failed versus how well the other requirements are satisfied. This ensures a relatively even load to be distributed to the cache nodes.

In some embodiments, the client may issue a read request to the load-balanced cache endpoint at 695 where the read request is associated with a cache key. The front end instance selected by the load balancer then fulfills the read request using the modified bucket map and routing table. When the cache nodes are organized as a set-associative caches, some embodiments reconcile the responses received from all the cache nodes that responded to a caching request such as a read request. Some embodiments determine how to select the response or the received values by setting a time bound for accepting the responses. Some embodiments wait for the first response to come back plus some interval of time for accepting additional responses. The responses received after that time period are discarded and not involved in the selection process.

In some embodiments, the front end then selects a response from the collection of responses. Some embodiments look at the majority of the responses and determine the most popular response. In some embodiments, each response is associated with a version or a time stamp that potentially signifies the freshness of the response. Some embodiments prefer to have a response sent back which indicates that it is a relatively new response even if the majority of the responses are of a different value. Some embodiments simply wait for the first confirmed response. For example, some embodiments may look for the first response that has two votes from the responses received back from the cache nodes regardless of the number of votes in the system. For example, the first cache node could respond with a response of A; the second cache node could respond with a response of B. The front end may continue to assess the following received responses. Upon receiving a response of A from a third cache node, the overall response is going to be A since that response is the same as one of the earlier ones.

Further, some embodiments determine when the cache may perform a throw-away operation where data (e.g., old data on the cache node) is thrown away, such as when the cache node is full. In some embodiments, the nodes may be a stateful nodes such that they receive requests over time where the state may be modified by the received requests and that the nodes may return responses to those requests based on the state of the nodes.

Figure 7:
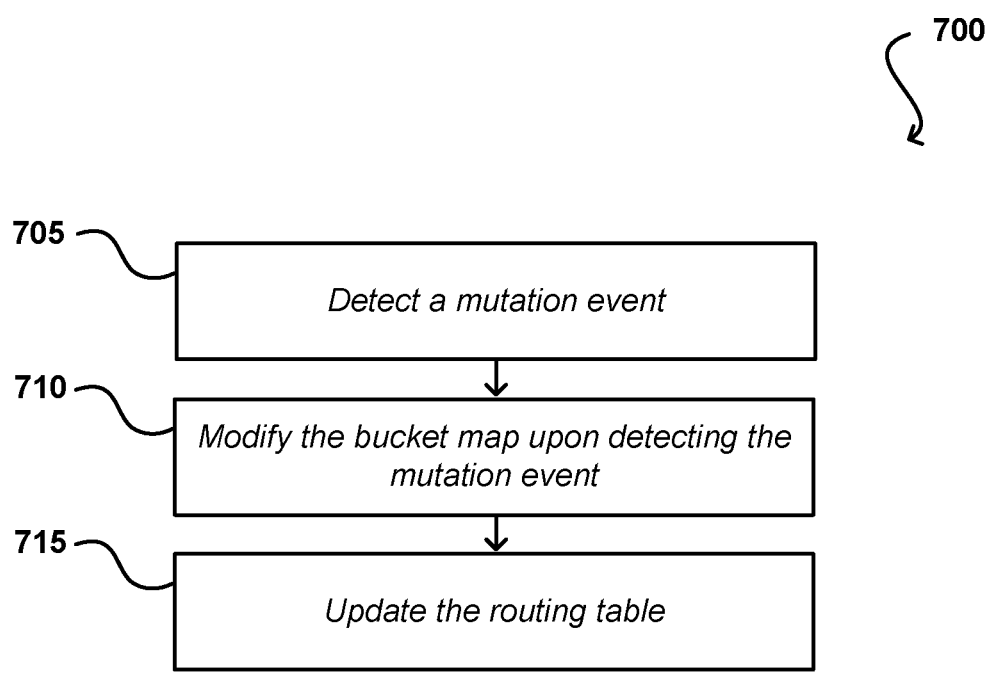
FIG. 7 illustrates an example of a process for performing a caching operation in accordance with some embodiments.

FIG. 7 illustrates an example of a process 700 for performing a caching operation in accordance with some embodiments. In this example, a mutation event is detected for a set of cache nodes 705. The mutation event causes a change in the number of the set of cache nodes that are operable at a threshold level. A bucket map is modified upon detecting the mutation event such that a number of identifiers to which a cache key may be mapped correspond to the change in the number of the set of cache nodes 710. The routing table is updated such that each of the identifiers may be mapped to one of the set of cache nodes 715. In some embodiments, each particular caching request may be associated with a particular cache key that can be mapped to a corresponding identifier within the modified bucket map and to a corresponding cache node within the updated routing table.

FIG. 8 and FIG. 9 illustrate examples 800 and 900 where requests may be routed differently upon a mutation event that causes a remapping of the bucket map and/or routing map. In some embodiments, a cache monitor monitors one or more cache nodes for changes (e.g., mutation events) that may occur. A properly functioning (e.g., "healthy") cache node may be able to correctly process incoming caching requests (e.g., write or read requests) and respond to such requests in a timely fashion. However, a cache node could fail for various reasons and become "unhealthy." In contrast to a "healthy" cache node, an "unhealthy" cache node, in one example, cannot process incoming requests correctly and/or cannot respond in a timely fashion to incoming requests.

A cache monitor, in one example, may monitor the "health" of cache nodes by polling or sampling the cache nodes and examining the responses from the polled cache nodes. For example, tests or canary operations may be performed to determine whether a cache node is functioning and responding properly. Also, a cache monitor may determine whether a cache node is "healthy" by analyzing whether it receives requests from a cache node at expected time intervals. If the cache monitor fails to receive requests from a cache node at expected time intervals, it may determine that the cache node is not functioning properly.

Because other types of changes or mutations could also affect a cache node, a cache monitor watches for these other mutation events as well. For example, a cache monitor may monitor cache nodes for overloading. A cache node may become overloaded when it has to process requests that exceed its tolerance threshold. When overloaded, such a cache node may not be able to process additional requests. In yet another example, a cache monitor may look for the appearance of a new cache node. When a new "healthy" cache node appears, some traffic (e.g., requests) may be directed to the new cache node.

FIGS. 8(a)-8(c) illustrates an example mutation event. FIG. 8(a) includes cache node 805, cache node 810, and cache node 815. In FIG. 8(a), cache nodes 805-810 are functioning properly and traffic (e.g., requests) is distributed as shown to the three cache nodes. The cache monitor (not shown) has not detected a mutation event. In FIG. 8(b), cache node 815 has undergone a mutation event. For example, as illustrated, cache node 815 has failed and can no longer perform its intended functions. The cache monitor has detected the mutation event. In FIG. 8(c), after the detection of the mutation event, traffic that was originally directed to cache node 815 is redirected to cache nodes 805 and 810.

Further, other types of mutations events (not illustrated here) could similarly cause redirection of traffic. For instance, if cache node 815 is experiencing higher than tolerable load, portions of the load may be redirected to cache node 805 and 810. FIGS. 9(a)-9(c) illustrates an example mutation event. FIG. 9(a) includes cache node 905, cache node 910, and cache node 915. In FIG. 9(a), cache nodes 905-915 are functioning properly and traffic (e.g., requests) is distributed as shown to the three cache nodes. The cache monitor (not shown) has not detected a mutation event.

In FIG. 9(b), "healthy" cache node 925 is added and becomes another available cache node. The cache monitor detects this additional available cache node and may inform one or more devices that is/are communicatively coupled with the cache monitor. In FIG. 9(c), after the detection of the mutation event, a portion of the traffic that was originally directed to cache nodes 905-915 is redirected to cache node 925. Further, other types of mutations events (not illustrated here) could similarly cause redirection of traffic. In one example, cache node 925 may not be a "new" cache node but instead may be a successfully repaired cache node that previously failed.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
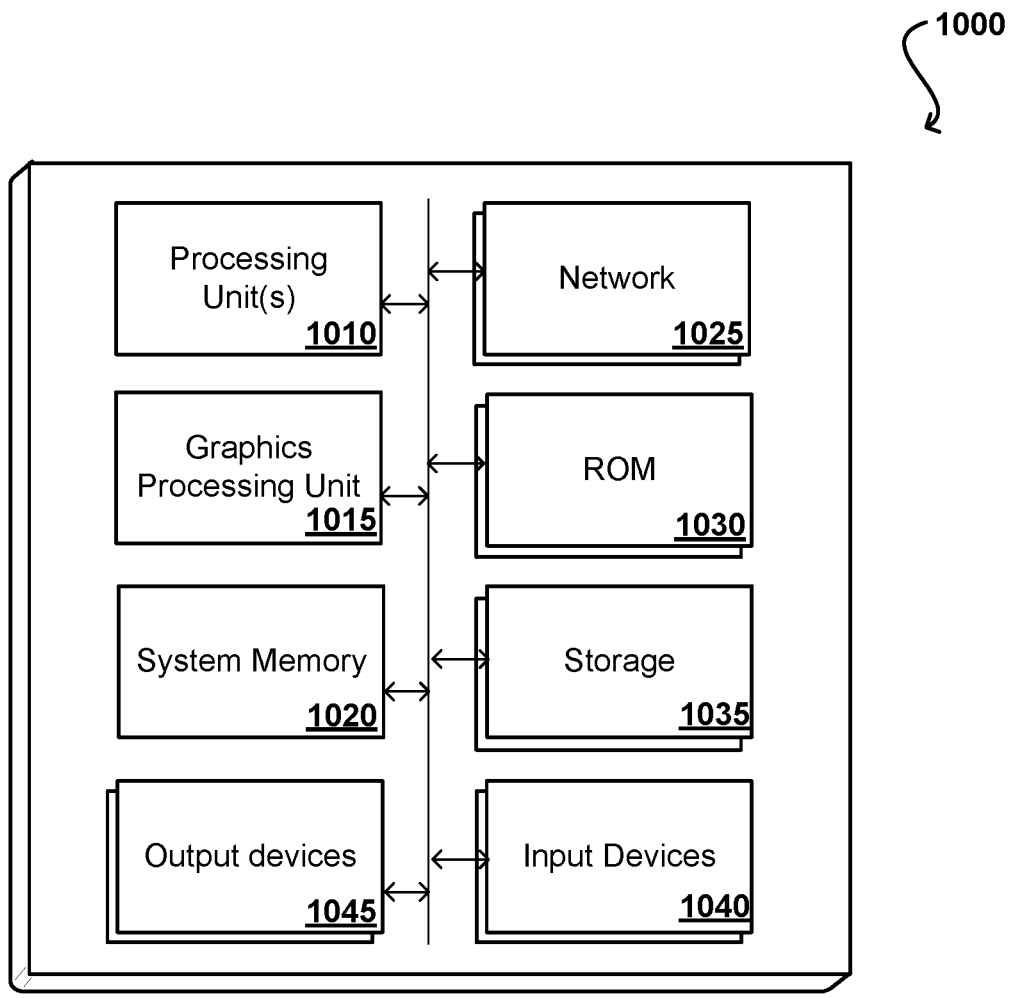
FIG. 10 conceptually illustrates an electronic system with which some embodiments of the invention are implemented.

FIG. 10 conceptually illustrates an electronic system 1000 with which some embodiments of the invention are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the GPU 1015, the system memory 1020, and the permanent storage device 1035.

From these various memory units, the processing unit(s) 1010 retrieves instructions to execute and data to process in order to execute the processes of the invention. The processing unit(s) may be a single processor or a multi-core processor in different embodiments. Some instructions are passed to and executed by the GPU 1015. The GPU 1015 can offload various computations or complement the image processing provided by the processing unit(s) 1010. In some embodiments, such functionality can be provided using CoreImage's kernel shading language.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, or ZIP® disk, and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor needs at runtime. In some embodiments, the invention's processes are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"). The output devices 1045 display images generated by the electronic system. The output devices 1045 include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying mean displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 2, 3, 5 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

Figure 11:
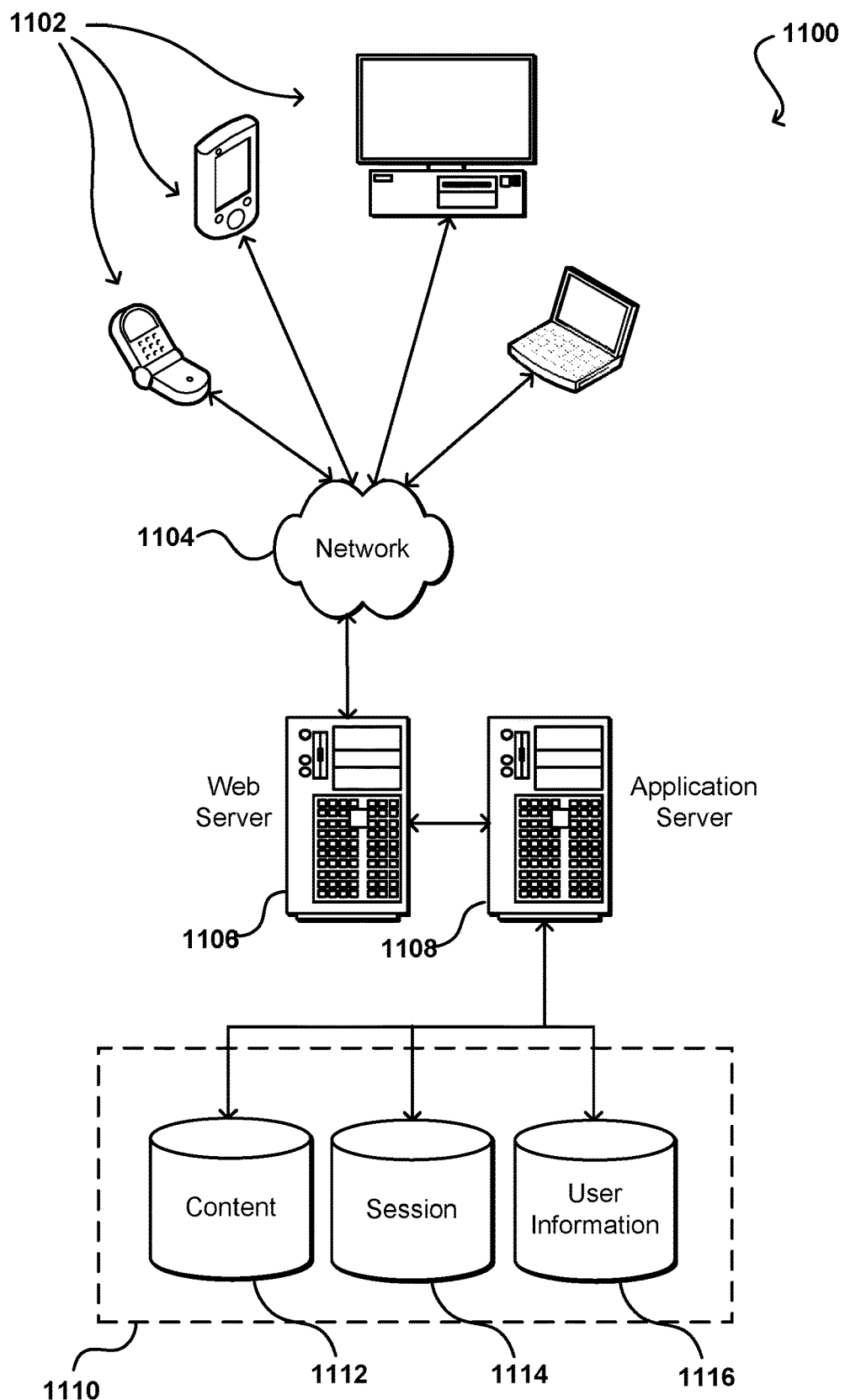
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. As will be appreciated, although a Web-based environment is used for purposes of explanation, different environments may be used, as appropriate, to implement various embodiments. The system includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1106 for receiving requests and serving content in response thereto, although for other networks, an alternative device serving a similar purpose could be used, as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1106 in the form of HTML, XML or another appropriate structured language in this example. The handling of all requests and responses, as well as the delivery of content between the client device 1102 and the application server 1108, can be handled by the Web server 1106. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing content (e.g., production data) 1112 and user information 1116, which can be used to serve content for the production side. The data store is also shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
a memory comprising computer-executable instructions; and
a processor configured to access the memory and execute the computer-executable instructions to at least:
receive, from a client, an upload request comprising one or more software artifacts corresponding to an application update for an application of a target machine;
store the one or more software artifacts at a proxy repository;
determine a continuation deployment action based at least in part on the upload request, the continuation deployment action comprising information describing at least one of the application or a machine environment in which the target machine operates; and
provide information associated with the upload request to a deployment service based at least in part on the continuation deployment action, the information configured to enable the deployment service to:
compare versions of software artifacts on the target machine with the one or more software artifacts to identify a subset of software artifacts of the one or more software artifacts; and
deploy the identified subset of software artifacts to the target machine if the versions of the software artifacts on the target machine are older than the identified subset of the software artifacts.

2. The system of claim 1, wherein determining the continuation deployment action is performed after storing the one or more software artifacts.

3. The system of claim 1, wherein the upload request comprises a HyperText Transfer Protocol (HTTP) request.

4. The system of claim 3, wherein the processor is further configured to access the memory and execute additional computer-executable instructions to at least parse the HTTP request to determine a uniform resource locator (URL) of the target machine or the machine environment.

5. The system of claim 1, wherein the upload request comprises encoded information relating to at least one of the application or the machine environment.

6. The system of claim 1, wherein:
the deployment service is one of a set of deployment services; and
wherein the processor is further configured to access the memory and execute additional computer-executable instructions to at least select the deployment service from the set of deployment services based at least in part on the continuation deployment action.

7. The system of claim 1, wherein the one or more software artifacts are a subset of software artifacts that is less than a complete set of software artifacts stored by the client.

8. The system of claim 1, wherein the information associated with the upload request identifies a storage location of the one or more software artifacts at the proxy repository.

9. A computer-implemented method, comprising:
receiving, from a client, an upload request comprising one or more software artifacts corresponding to an application update for an application of a virtual machine;
storing the one or more software artifacts at a proxy repository;
determining a continuation deployment action based at least in part on upload request, the continuation deployment action comprising information describing a machine environment in which the virtual machine operates; and
providing information associated with the upload request to a deployment service based at least in part on the continuation deployment action, the information configured to enable the deployment service to:
compare versions of software artifacts on the virtual machine with the one or more software artifacts to identify a subset of software artifacts of the one or more software artifacts; and
deploy the identified subset of software artifacts to the virtual machine if the versions of the software artifacts on the virtual machine are older than the identified subset of the software artifacts.

10. The computer-implemented method of claim 9, wherein determining the continuation deployment action is performed after storing the one or more software artifacts at the proxy repository.

11. The computer-implemented method of claim 9, wherein the information associated with the upload request comprises location information for accessing the one or more software artifacts from the proxy repository.

12. The computer-implemented method of claim 11, further comprising:
storing additional software artifacts corresponding to the application at the proxy repository, the one or more software artifacts and the additional software artifacts defining a complete set of software artifacts;
receiving a request from the deployment service for an application bundle that includes the complete set of software artifacts; and
providing the application bundle to the deployment service.

13. The computer-implemented method of claim 12, further comprising deleting the complete set of software artifacts from the proxy repository after providing the application bundle to the deployment service.

14. One or more computer-readable media comprising computer-executable instructions that, when executed by one or more computer systems, cause the one or more computer systems to perform operations comprising:
receiving, from a client, an upload request comprising one or more software artifacts corresponding to an application update for an application of a virtual machine;
storing the one or more software artifacts at a proxy repository;
determining a continuation deployment action based at least in part on the upload request, the continuation deployment action comprising information describing at least one of the virtual machine or a machine environment in which the virtual machine operates, and a deployment service configured to deploy the one or more software artifacts; and
providing information associated with the upload request to the deployment service based at least in part on the continuation deployment action, the information configured to enable the deployment service to:
compare versions of software artifacts on the virtual machine with the one or more software artifacts to identify a subset of software artifacts of the one or more software artifacts; and
deploy the identified subset of software artifacts to the virtual machine if the versions of the software artifacts on the virtual machine are older than the identified subset of the software artifacts.

15. The one or more computer-readable media of claim 14, wherein the client develops the application, and the one or more software artifacts define a portion of the application.

16. The one or more computer-readable media of claim 14, wherein:
the computer-readable media include further instructions that when executed cause the one or more computer systems to perform further operations comprising receiving, from a different client, a different upload request comprising one or more different software artifacts corresponding to the application of the virtual machine;
determining the continuation deployment action comprises determining the continuation deployment action based at least in part on the one or more different software artifacts; and
the deployment service is further enabled to use the information to deploy the one or more different software artifacts to the virtual machine.

17. The one or more computer-readable media of claim 14, wherein the one or more software artifacts comprise an updated version of a portion of the application.

* * * * *